United States Patent [19]
Singyouti

[11] Patent Number: 6,118,320
[45] Date of Patent: Sep. 12, 2000

[54] CLOCK INPUT CIRCUIT

[75] Inventor: Kenzi Singyouti, Kanagawa, Japan

[73] Assignee: NEC Corporation, Tokyo, Japan

[21] Appl. No.: 09/092,075

[22] Filed: Jun. 5, 1998

[30] Foreign Application Priority Data

Jun. 5, 1997 [JP] Japan .................................. 9-147709

[51] Int. Cl.⁷ .................................................. G06F 1/04
[52] U.S. Cl. .......................... 327/291; 327/308; 327/309
[58] Field of Search .................................... 327/291, 293, 327/306, 308, 309, 315, 318, 321

[56] References Cited

U.S. PATENT DOCUMENTS

| | | | |
|---|---|---|---|
| 4,672,632 | 6/1987 | Andersen .................................. | 375/57 |
| 4,768,178 | 8/1988 | Conklin et al. ............................ | 368/47 |
| 4,810,949 | 3/1989 | Schiemenz et al. ...................... | 323/354 |
| 5,321,847 | 6/1994 | Johnson, Jr. ............................... | 455/63 |
| 5,341,423 | 8/1994 | Nossen ........................................ | 380/6 |

FOREIGN PATENT DOCUMENTS 6-325229  11/1994  Japan .

*Primary Examiner*—Timothy P. Callahan
*Assistant Examiner*—Hai L. Nguyen
*Attorney, Agent, or Firm*—Sughrue, Mion, Zinn, Macpeak & Seas, PLLC

[57] ABSTRACT

A clock input circuit for a portable information medium is provided which has a low power consumption and extends the communication range of the portable information medium. The clock input circuit receives an input signal via an antenna of the portable information medium and generates a clock signal based on the input signal. Also, the clock input circuit contains an attenuator, a control signal generator, a selector circuit, and a clock signal processor. The attenuator receives the input signal and outputs at least one attenuated signal. The control signal generator inputs the input signal and generates at least one control signal based on an amplitude of the input signal. The selector circuit inputs the at least one attenuated signal and creates an output signal based on the at least one attenuated signal and the at least one control signal. The clock signal processor inputs the output signal and generates the clock signal based on the output signal.

40 Claims, 10 Drawing Sheets

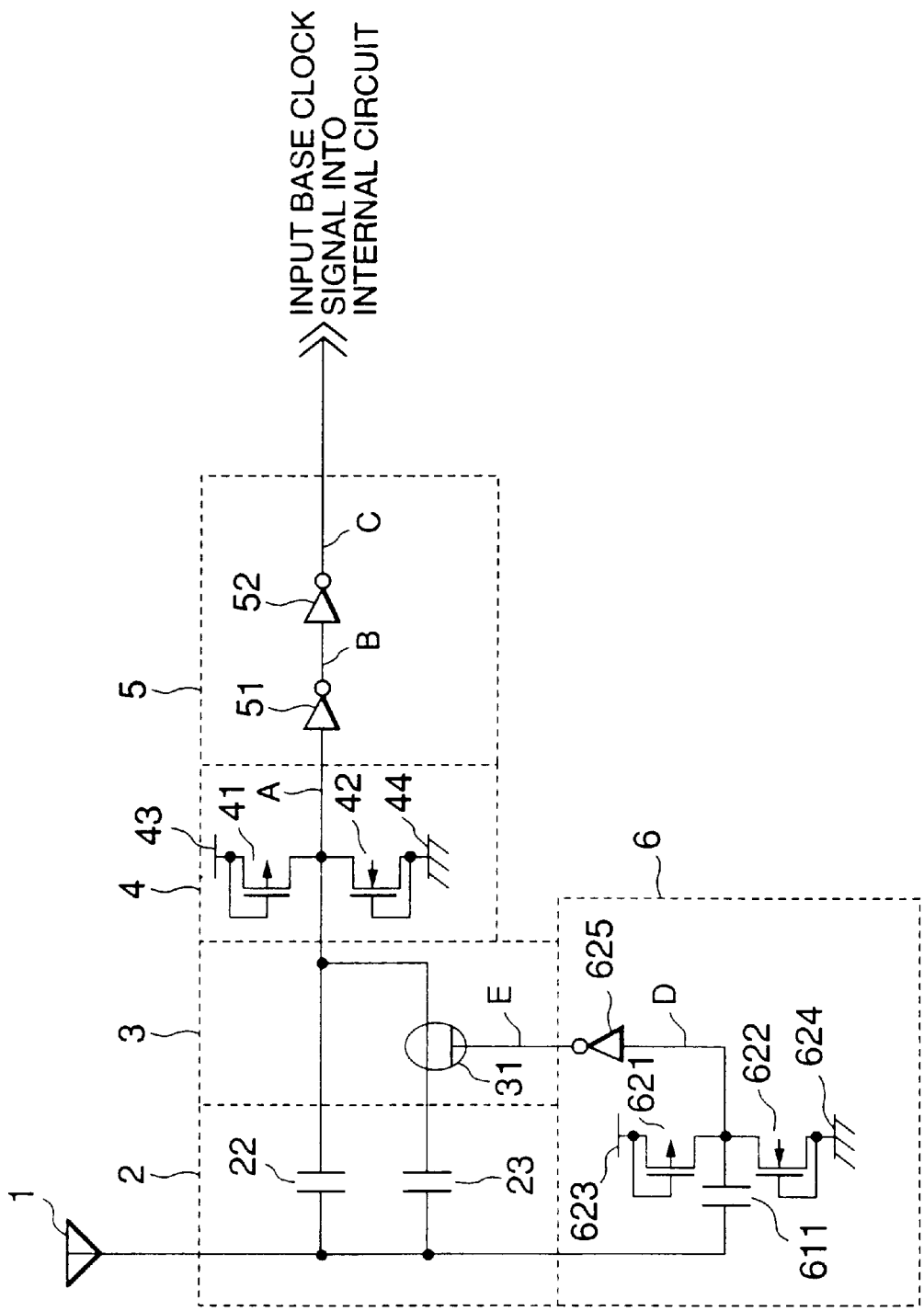

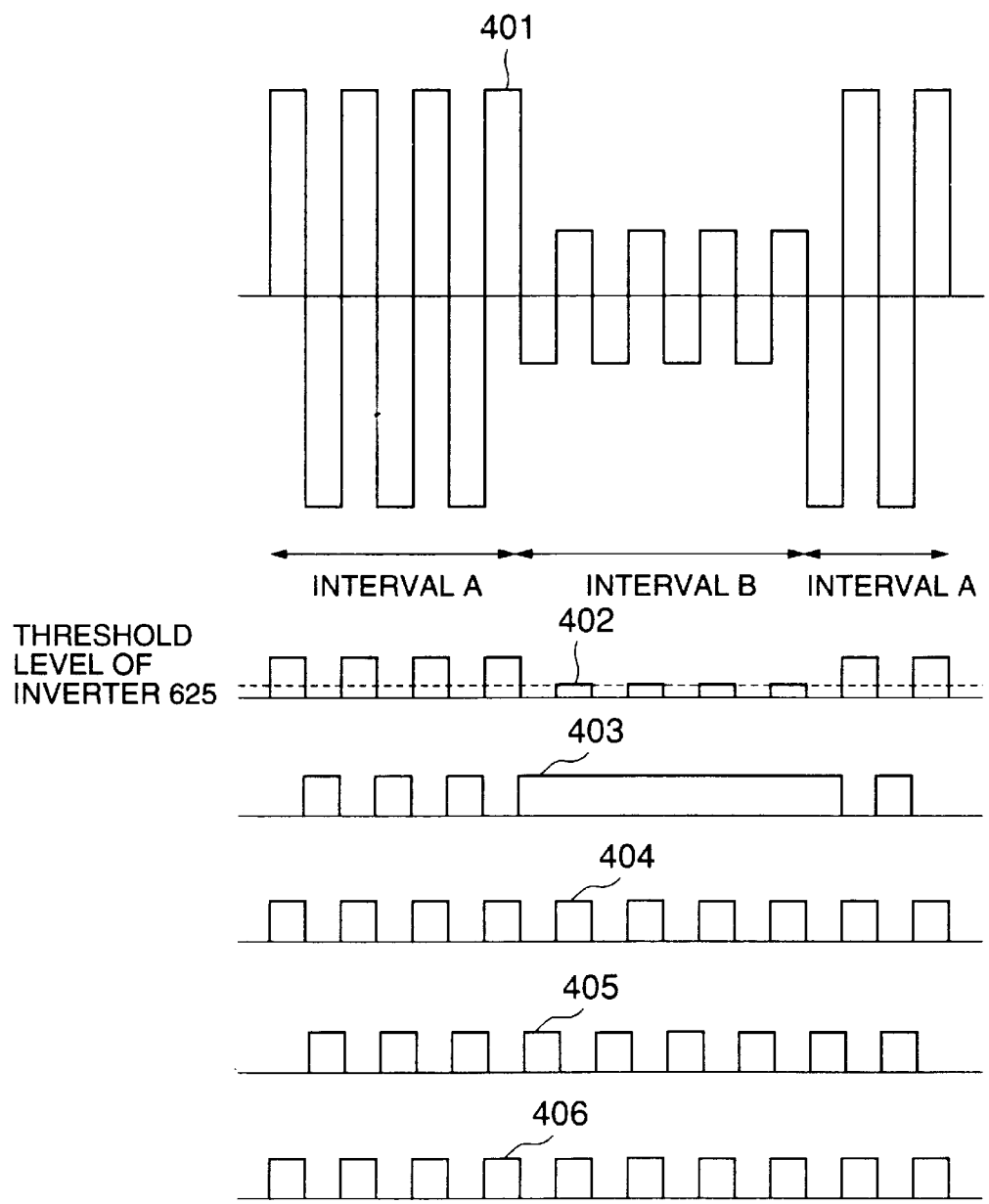

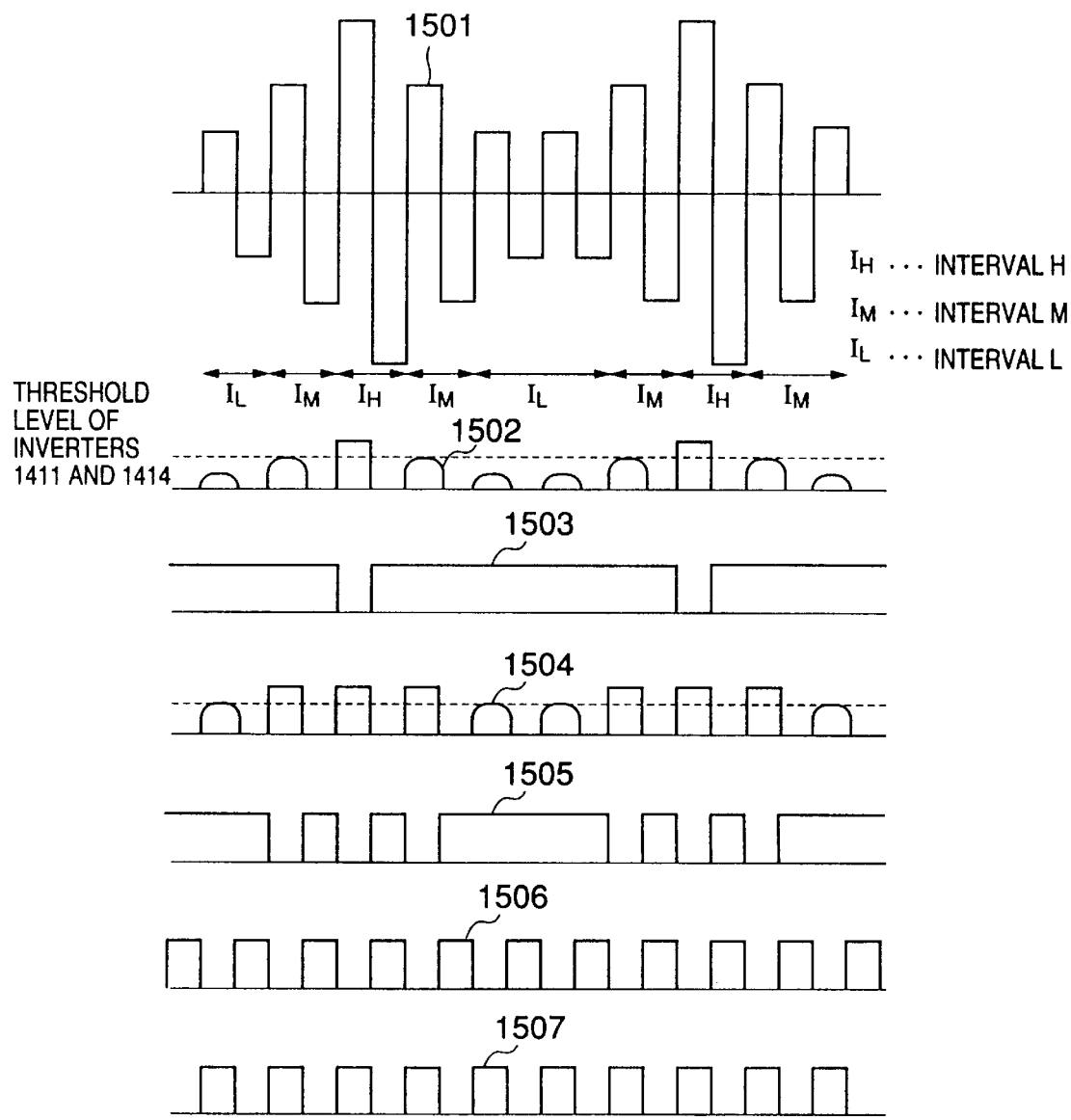

CLOCK INPUT CIRCUIT

FIELD OF THE INVENTION

The present invention relates to a clock input circuit used in a portable information medium (e.g. a non-contact integrated circuit ("IC") card) which operates by receiving energy and data from an external source via electromagnetic means. A clock signal is transmitted in conjunction the data and is input by the portable information medium via an antenna. More particularly, the invention relates to a clock input circuit which has a low power consumption.

BACKGROUND OF THE INVENTION

FIGS. 7A to 7C illustrate a conventional non-contact IC card, and FIG. 8 shows the waveforms of various signals generated by the IC card. (The conventional IC card is described in Japanese Patent Application Laid-Open No. 6-325229).

As shown in FIG. 7A, the IC card comprises an input antenna 701, a rectifier circuit 702, a clock input circuit 703, a detector circuit 704, a voltage controlled oscillator ("VCO") 706, a response signal generator circuit 707, a carrier wave generator circuit 708, a modulator circuit 709, and an output antenna 710. The input antenna 701 receives an input signal 801 (FIG. 8) from a card reader (not shown) and outputs the input signal 801 to the rectifier circuit 702, the clock input circuit 703, and the detector circuit 704.

The rectifier circuit 702 generates a supply voltage used by the various components of the IC card based on the input signal 801. The detector circuit 704 demodulates the data contained in the input signal 801 to produce a demodulated data signal and supplies the demodulated data signal to the internal circuitry of the IC card. Also, the clock input circuit 703 generates a base clock based on the carrier signal of the input waveform 801 and supplies the base clock to the internal circuitry of the IC card to synchronize various operations of IC card.

The supply voltage generated by the rectifier circuit 702 is also provided to the VCO 706, and the VCO 706 generates an oscillation signal which has a frequency that is proportional to the supply voltage. The response signal generator circuit 707 inputs the oscillation signal and generates a response signal based on the frequency of such signal. The carrier wave generator circuit 708 generates a carrier wave, and the modulator circuit 709 superimposes the response signal on the carrier wave to produce an output signal. Then, the output signal is transmitted via the output antenna 710.

FIG. 7B shows one example of the configuration of the clock input circuit 703. As shown in the figure, the circuit 703 contains two inverters 7031 and 7032. The inverter 7031 inputs the input signal 801 from the input antenna 701 and inverts such signal 801 to generate an inverted signal 802. The inverter 7032 inputs the inverted signal 802 and inverts such signal to generate the base clock signal 803.

FIG. 8 shows the detailed configuration of the input signal 801. The signal 801 has a first interval A and a second interval B which follows the first interval A. During the first interval A, the input signal 801 has a large amplitude and defines a high voltage input interval (i.e. defines a logic "1"). During the second interval B, the input signal 801 has a small amplitude and defines a low voltage interval (i.e. defines a logic "0"). The signal 801 is inverted by the inverter 7031 to produce the signal 802. In other words, the signal 802 is sampled at the point B7 in FIG. 7B. Since the supply voltage for the inverter 7031 is supplied from the rectifier circuit 702, a high level voltage output from the inverter 7031 equals the voltage of the supply voltage.

Then, the signal 802 is inverted by the inverter 7032 to produce the signal 803. In other words, the signal 803 is sampled at the point C7 in FIG. 7B, and the signal 803 is output as the base clock.

FIG. 7C shows another example of the configuration of the clock input circuit 703 illustrated in FIG. 7A. The clock input circuit 703 in FIG. 7C is the same as the clock circuit 703 shown in FIG. 7B except that it comprises a capacitor 7033 and transistors 7035 and 7036 inserted between the antenna 701 and the inverter 7031. The capacitor 7033 serves as a protector circuit, and transistors 7035 and 7036 serve as a clamp circuit. The protector circuit and clamp circuit are used to protect the transistors in the inverter 7031 in the clock circuit 703. Specifically, in order to increase the range of at which the IC card can communicate with the card reader, the input signal 801 output from the card reader is designed to have a high voltage. However, as the transistors in the IC card are miniaturized, the dielectric strength of transistors is lowered, and thus, the transistors must be protected from the high voltage.

The capacitance of the capacitor 7033 lowers the voltage of the received input signal 801 but is selected to have a value such that the voltage can be sensed by the inverter 7031 even when the input signal 801 has a low voltage (i.e. even when the interval B of the signal 801 is being transmitted). If a voltage which is higher the sum of the threshold voltage of the P type transistor 7035 and the supply voltage 7034 is input to the clamp circuit, the transistor 7035 is turned on and clamps the voltage at the point A7 at the supply voltage 7034. Also, if a voltage which is lower than sum of the threshold voltage of the N type transistor 7036 and the voltage of ground ("GND") 7037 is input to the clamp circuit, the transistor 7036 turns on and clamps the voltage at the point A7 at the voltage of GND 7037. Thus, the signals 802 and 803 having the waveforms shown in FIG. 8 can be respectively output from the inverters 7031 and 7032 without applying high voltage to the input of the inverter 7031.

Even though the clock input circuit 703 functions properly without applying a high voltage to the inverter 7031, it has several disadvantages. For example, since the clamp circuit contained in the clock input circuit 703 consumes a lot of power, the clock input circuit 703 does not efficiently use the limited power obtained by rectifying the data signal received from the card reader (not shown). Also, since the circuit 703 needs to consume a lot of power from the input data signal, the communication range between the card reader (not shown) and the IC card is shortened.

SUMMARY OF THE INVENTION

An object of the present invention is to eliminate the above problems by reducing the power consumption of a clock input circuit and extending the communication range of a portable information medium.

In order to achieve the above and other objects, a clock input circuit is provided in a portable information medium. The clock input circuit receives an input signal via an antenna of said portable information medium and generates a clock signal based on said input signal. Also, the clock input circuit, comprises: an attenuator operably connected to said antenna, wherein said attenuator receives said input signal and outputs at least one attenuated signal; a control signal generator operably connected to said antenna, wherein said control signal generator inputs said input signal and generates at least one control signal based on an amplitude of said input signal; a selector circuit which is operably connected to said attenuator and to said control signal generator, wherein said selector circuit inputs said at least one attenuated signal and creates an output signal based on said at least one attenuated signal and said at least one control signal; and a clock signal processor which is operably coupled to said selector circuit, wherein said clock signal processor inputs said output signal and generates said clock signal based on said output signal.

BRIEF DESCRIPTION OF THE DRAWINGS

The above objects and advantages of the present invention will become more apparent by describing in detail preferred embodiments thereof with reference to the attached drawings in which:

FIG. 3 shows an example of a detailed circuit diagram of the clock input circuit shown in FIG. 1A which incorporates the control signal generator circuit shown in FIG. 2A;

FIG. 4 shows various waveforms of signals generated or processed by the clock input circuit shown in FIG. 3;

FIG. 10 shows various waveforms of signals generated or processed by the clock input circuit shown in FIG. 9.

DETAILED DESCRIPTION OF THE PREFERRED EMBODIMENTS

The following description of the preferred embodiments discloses specific configurations, components, and values. However, the preferred embodiments are merely examples of the present invention, and thus, the specific features described below are merely used to more easily describe such embodiments and to provide an overall understanding of the present invention. Accordingly, one skilled in the art will readily recognize that the present invention is not limited to the specific embodiments described below. Furthermore, the descriptions of various configurations, components, and values of the present invention which would have been known to one skilled in the art are omitted for the sake of clarity and brevity.

Figure 1A:
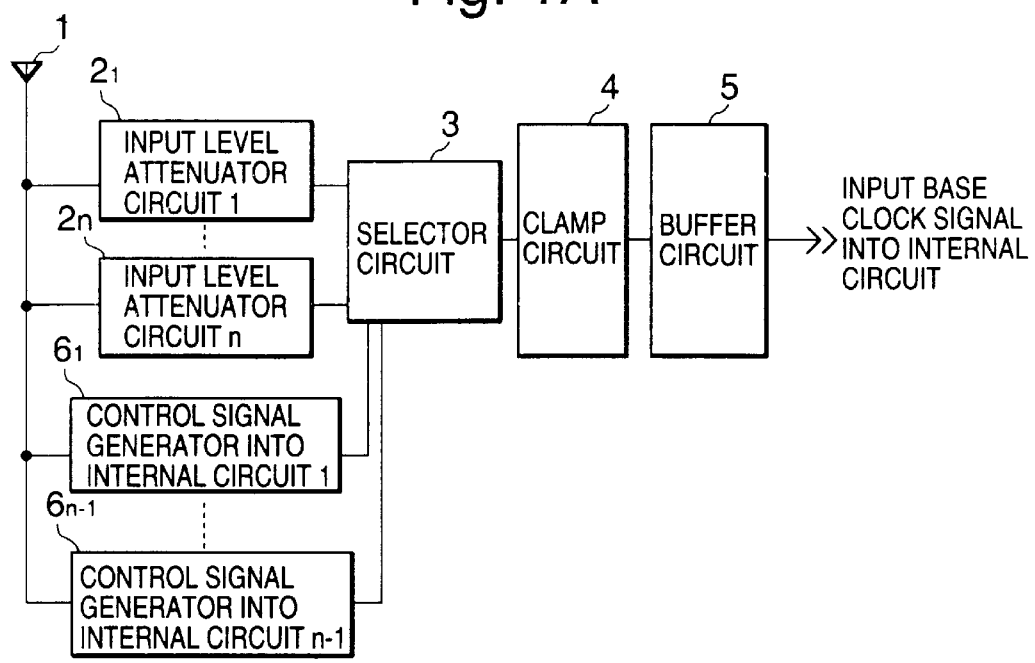
FIG. 1A shows a clock input circuit according to an embodiment of the present invention.
Figure 1B:
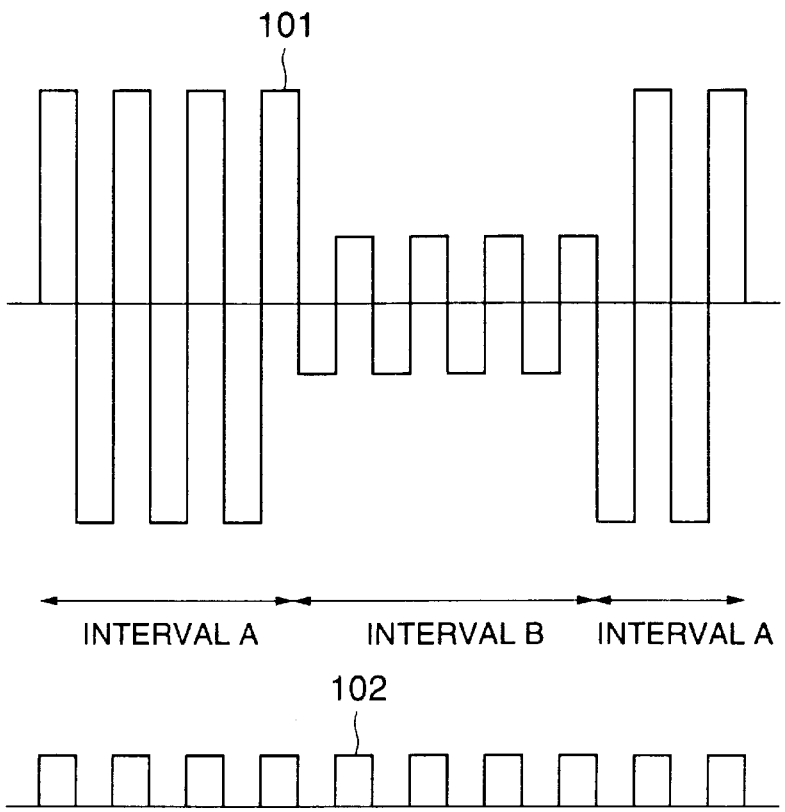
FIG. 1B shows various waveforms of signals generated or processed by the clock input circuit shown in FIG. 1A.

FIG. 1A shows an illustrative embodiment of a clock input circuit in accordance with one embodiment of the present invention, and FIG. 1B illustrates various signals processed or generated by the clock input circuit. As shown in FIG. 1A, the clock input circuit comprises an attenuator 2 having (n) attenuator circuits $2_1$ to $2_n$, a control signal generator 6 having (n-1) control signal generator circuits $6_1$ to $6_{n-1}$, a selector circuit 3, a clamp circuit 4, and a buffer circuit 5. An input signal 101 (FIG. 1B) is input via an antenna 1 and output to the attenuator circuits $2_1$ to $2_n$ and to the control signal generator circuits $6_1$ to $6_{n-1}$. The attenuator circuits $2_1$ to $2_n$ attenuate the voltage of the input signal 101 to produce (n) attenuated voltage signals, and the generator circuits $6_1$ to $6_{n-1}$ generate (n-1) control signals based on the voltage of the input signal 101.

The selector circuit 3 inputs the (n) attenuated voltage signals and the (n-1) control signals and selectively outputs the attenuated voltage signals based on the control signals. In particular, the (n-1) control signals instruct the selector circuit 3 to selectively output one or more of the attenuated voltage signals to form a composite signal having an amplitude which is close to the internal supply voltage of the IC card. Then, the composite signal is input to the clamp circuit 4, and the clamp circuit 4 produces a clamped voltage signal. Then, the clamped voltage signal is output to the buffer circuit 5, and the buffer circuit 5 outputs a corresponding base clock signal. Since the selector circuit 3 generates a composite voltage signal which has a voltage that is close to the internal supply voltage of the system, the clamp circuit 4 rarely needs to operate and perform a clamping function to clamp the attenuated voltage signal. Therefore, the amount of power consumed by the clock input circuit is dramatically reduced.

Figure 2A:
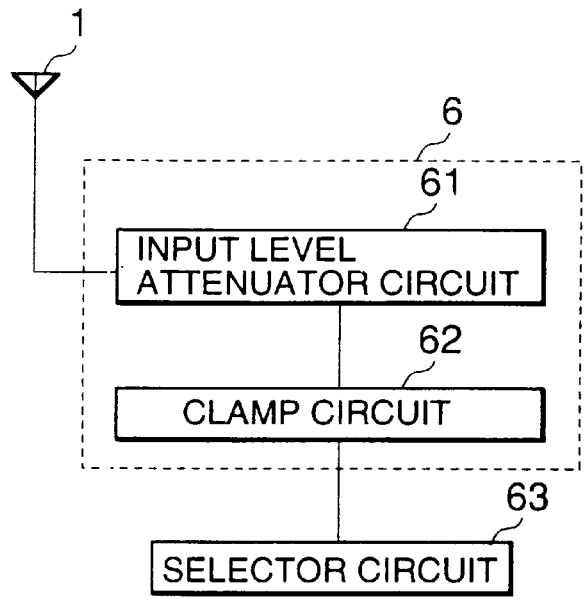
FIG. 2A shows a first illustrative example of the control signal generator circuit shown in FIG. 1A.

FIG. 2A shows an illustrative example of the structure of one of the control signal generator circuits $6_1$ to $6_{n-1}$. As shown in the figure, the control signal generator circuit 6 comprises an attenuator circuit 61 and a clamp circuit 62. The attenuator circuit 61 inputs the input signal 101 and attenuates the signal to produce an attenuated signal. Then, the clamp circuit 62 clamps the attenuated signal, if necessary, to produce a clamped signal and outputs the clamped signal as a control signal.

FIG. 3 shows an illustrative example of a clock input circuit in which the control signal generator 6 contains one control signal generator circuit $6_1$ (i.e. the circuit $6_x$ shown in FIG. 2A), and FIG. 4 illustrates the waveforms of various signals located at various points A to E in the circuit. As shown in FIG. 3, the attenuator 2 comprises two attentuator circuits (i.e. capacitors 22 and 23), and the selector circuit 3 comprises a transfer gate 31. Also, the clamp circuit 4 comprises a P-type MOS transistor 41 and an N-type MOS transistor 42, and the buffer circuit 5 comprises inverters 51 and 52.

Also, the control signal generator circuit $6_1$ comprises the attenuator circuit 61 and the clamp circuit 62. The attenuator circuit 61 comprises a capacitor 611, and the clamp circuit comprises a P-type MOS transistor 621, an N-type MOS transistor 622, and an inverter 625.

The point A represents the output of the clamp circuit 4, the point B represents the output of the inverter 51, and the point C represents the output of the inverter 52. In addition, the point D represents the input to the inverter 625, and the point E represents the output of the inverter 625.

FIG. 4 illustrates the input signal 401 which is received by the input antenna 1. The signal 401 has a first interval A and a second interval B which follows the first interval A. During the first interval A, the input signal 401 has a large amplitude which defines a high voltage input interval (i.e. defines a logic "1"). During the second interval B, the input signal 401 has a small amplitude which defines a low voltage interval (i.e. defines a logic "0"). The signal 402 represents the signal input to the inverter 625 (i.e. the signal at point D), and the signal 403 represents the signal output from the inverter 625 (i.e. the signal at point E). The signal 404 represents the signal output from the clamp circuit 4 (i.e. the signal at point A), the signal 405 represents the signal output from the inverter 51 (i.e. the signal at point B), and the signal 406 represents the signal output from the inverter 52 (i.e. the signal at point C).

In the present embodiment, the capacitors 22, 23, and 611 respectively have capacitances $C_{22}$, $C_{23}$, and $C_{611}$ which satisfy the following equation (1):

$$C_{611}=C_{22} \tag{1}$$

With respect to the relationship between the capacitances $C_{22}$ and $C_{23}$, the ratio of the capacitances $C_{22}$ and $C_{23}$ is dependent upon the ratio in the amplitude of the input signal 401 in the interval A to the amplitude of the signal in the interval B. Specifically, when the ratio of the amplitudes equals two, the capacitances $C_{22}$ and $C_{23}$ are designed to be equal. When the ratio of the amplitudes is larger than two, the capacitance $C_{23}$ is designed to be larger than the capacitance $C_{22}$, and when the ratio of the amplitudes is smaller than two, the capacitance $C_{23}$ is designed to be smaller than the capacitance $C_{22}$. Examples of values of the ratio and the capacitances $C_{22}$ and $C_{23}$ are shown in the following table.

| Ratio of amplitude of input signal 401 in interval A to amplitude of input signal in interval B. (Interval A:Interval B) | Ratio of capacitance $C_{22}$ to capacitance $C_{23}$. ($C_{22}$:$C_{23}$) |
|---|---|
| 10:1 | 1:9 |
| 5:1 | 1:4 |
| 2:1 | 1:1 |
| 1.5:1 | 1:0.5 |

Also, the values of the capacitances $C_{22}$ and $C_{611}$ are such that the attenuated voltage signals output from the capacitors 22 and 611 only have a voltage which is larger than the threshold voltage of the inverters 51 and 625 during the interval A of the input signal 401. Therefore, the attenuating voltage signals output from the capacitors 22 and 611 have a voltage which is smaller than the threshold voltage of the inverters 51 and 625 during the interval B of the input signal 401. As a result, the inverters 51 and 625 only output an inverted signal of the input signal 401 during interval A of the input signal. On the other hand, the value of the capacitance $C_{23}$ of the capacitor 23 is such that the inverter 51 can output an inverted signal even during the interval B of input signal 401. Since the capacitance $C_{611}$ reduces the voltage of the input signal 401 below the threshold level of the inverter 625 during the interval B of the input signal 401, the inverter 625 senses that the signal 402 is a logic "0".

During the interval A of the input signal 401, the inverter 625 outputs a logic "0" when the voltage of the input signal 401 is positive, and thus, the transfer gate 31 is turned off when the voltage of the input signal 401 is positive. Also, during the interval A, the inverter 625 outputs a logic "1" when the input signal 401 is negative, and thus, the transfer gate 31 is turned on when the voltage of the input signal is negative.

As a result of the above operation, when a positive input signal 401 is input to the attenuator 2 during the interval A, the attenuator 2 reduces the voltage of the input signal 401 based only on the capacitance $C_{22}$ of the capacitor 22 to produce the attenuated signal 404 (i.e. the signal at point A). Then, the inverter 51 inverts the signal 404 to produce the signal 405 (i.e. the signal at point B), and the inverter 52 inverts the signal 405 to produce the signal 406 (i.e. the signal at point C). In other words, the inverter 52 outputs the signal 406 as the base clock signal which has a phase that coincides with the phase of the input signal 401.

On the other hand, during the interval B of the input signal 401, the capacitor 611 reduces the voltage of the input signal 401 below the threshold voltage of the inverter 625. Accordingly, the inverter 625 outputs a logic "1" when the voltage of the input signal 401 is positive or negative, and thus, the transfer gate 31 is constantly on during the interval B. As a result, when the input signal 401 is input to the attenuator 2 during the interval B, the attenuator 2 reduces the voltage of the input signal 401 based the capacitances $C_{22}$ and $C_{23}$ of both capacitors 22 and 23 to produce the attenuated signal 404. Then, the inverter 51 inverts the signal 404 to produce the signal 405, and the inverter 52 inverts the signal 405 to produce the signal 406.

Figure 7A:
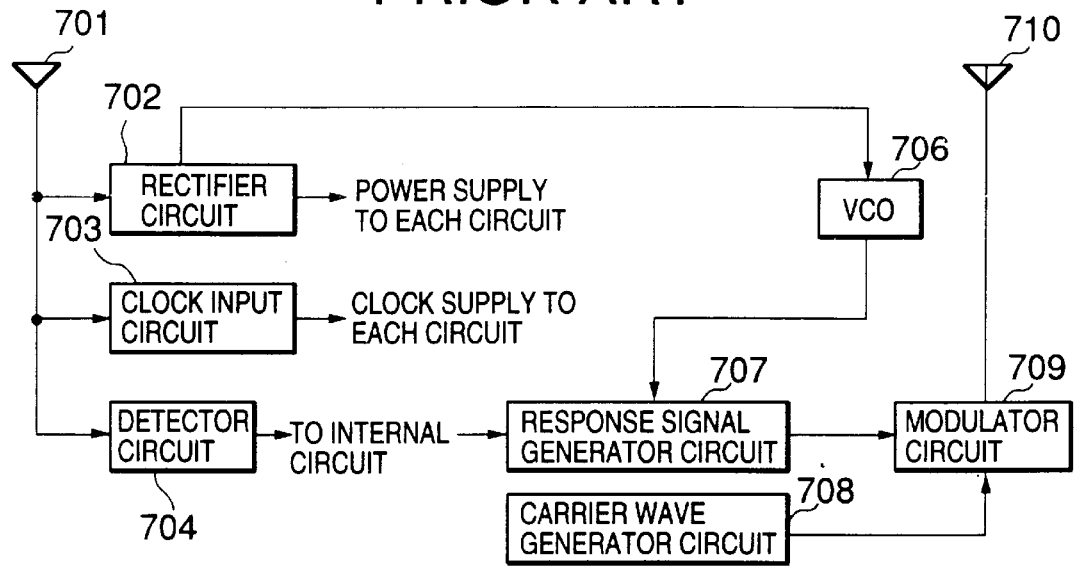
FIG. 7A shows a conventional IC card.
Figure 7B:
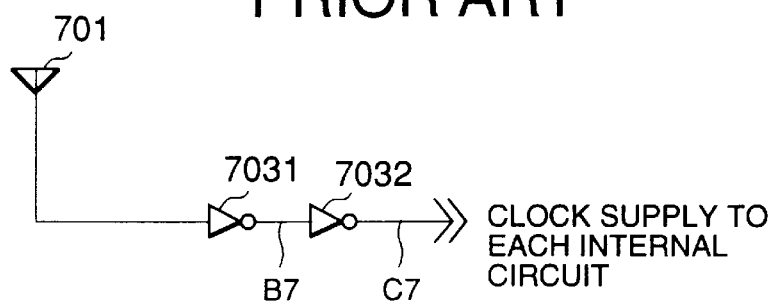
FIG. 7B shows a first clock input circuit of the conventional IC card shown in FIG. 7A.
Figure 7C:
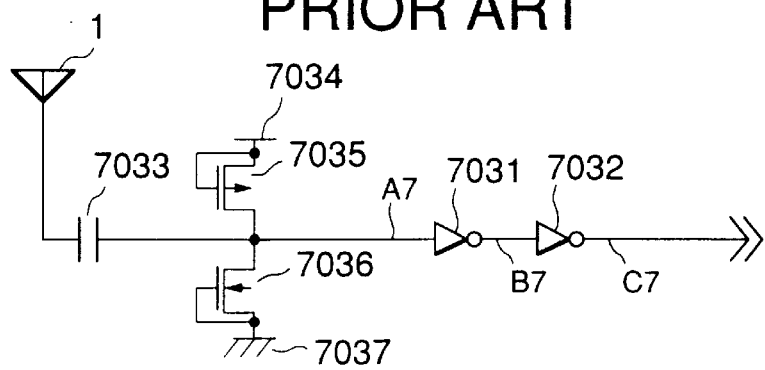
FIG. 7C shows a second clock input circuit of the conventional IC card shown in FIG. 7A.
Figure 8:
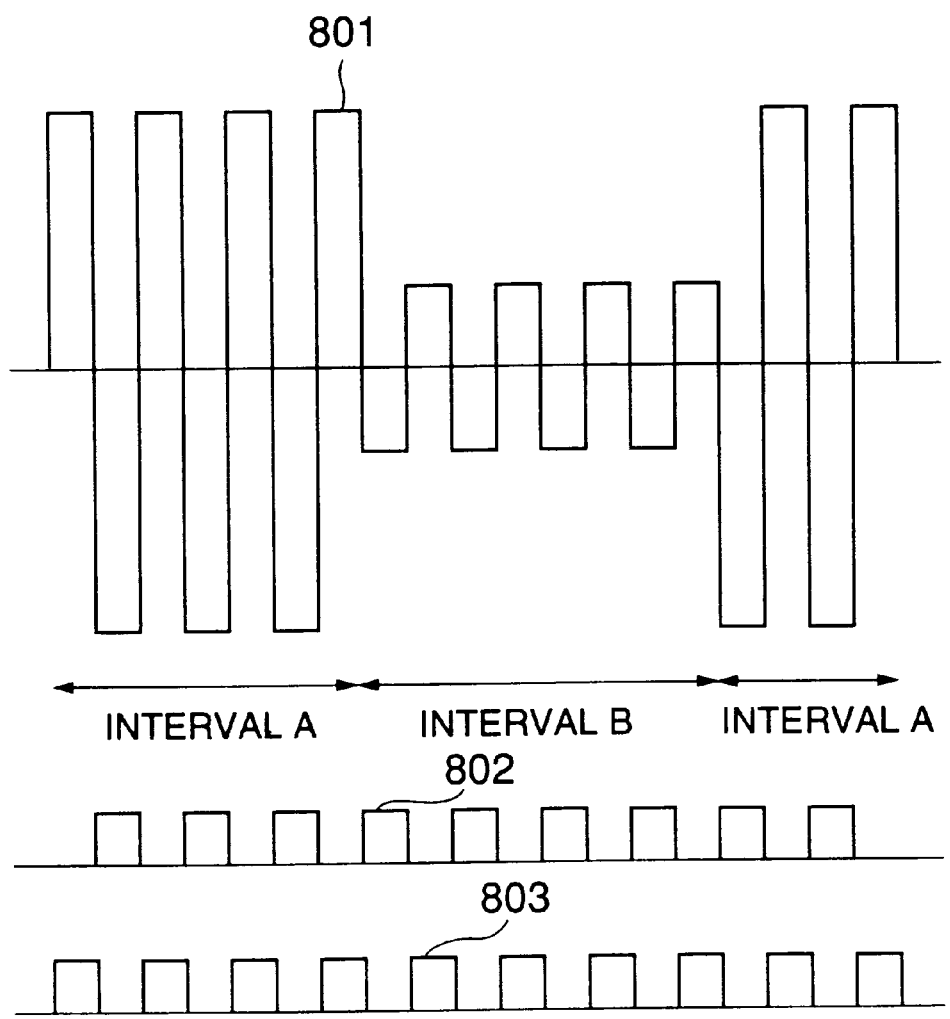
FIG. 8 shows various waveforms of signals generated or processed by the clock input circuits shown in FIGS. 7B and 7C.

In order to illustrate how the clock input circuit of the present embodiment significantly reduces the consumption of power, the power consumption of the present embodiment will be compared with the power consumption of the conventional circuit shown in FIG. 7C. For the purposes of the comparison, the following variables will be used:

| | |
|---|---|
| $V_{401}$ | voltage of the input signal 401 |
| $V_A$ | voltage at the point A (FIG. 3) of the circuit of the present embodiment |
| $V_{A7}$ | voltage at the point A7 (FIG. 7C) of the conventional circuit |
| $I_4$ | current flowing through the clamp circuit 4 (FIG. 3) of the present embodiment |
| $I_{7C}$ | current flowing through the conventional clamp circuit (FIG. 7C) |
| $C_{22}$ | capacitance of the capacitor 22 (FIG. 3) |
| $C_{23}$ | capacitance of the capacitor 23 (FIG. 3) |
| $C_{7033}$ | capacitance of the capacitor 7033 (FIG. 7C) |

Also, in the above example, the capacitance $C_{7033}$ is approximately equal to the sum of the capacitances $C_{22}$ and $C_{23}$ (i.e. $C_{7033} \approx C_{22}+C_{23}$). Also, the carrier signal frequency for input signal 401 is $\omega$, and the imaginary number symbol is j. Accordingly, when the input signal 401 is input to the circuit of the present embodiment during the interval A, equation (2) holds true:

$$I_4=j\omega C_{22}(V_{401}-V_A) \tag{2}$$

When the input signal 401 is input to the circuit of the present embodiment during the interval B, equation (3) holds true:

$$I_4=j\omega(C_{22}+C_{23})(V_{401}-V_A) \tag{3}$$

When the input signal 401 is input to the conventional circuit shown in FIG. 7C during the interval A, equation (4) holds true:

$$I_{7C}=j\omega C_{7033}(V_{401}-V_{A7}) \tag{4}$$

Finally, when the input signal 401 is input to the conventional circuit shown in FIG. 7C during the interval B, equation (5) holds true:

$$I_{7C}=j\omega C_{7033}(V_{401}-V_{A7}) \tag{5}$$

In the above equations, the voltages $V_A$ and $V_{A7}$ are equal (i.e. $V_A=V_{A7}$) because they are respectively clamped to the same supply voltage by the P-type transistors 41 and 7035. Therefore, since $C_{22}$ is less than $C_{7033}$ (i.e. $C_{22}<C_{7033}$), the value of the current $I_4$ determined by equation (2) is smaller than the value of the current $I_{7C}$ determined by the equation (4). In other words, during the interval A of the input signal 401, the current flowing through the clamp circuit 4 of the present embodiment is smaller than the current flowing through the conventional clamp circuit shown in FIG. 7C. Therefore, the power consumption of the clamp circuit 4 is significantly less than the power consumption of the conventional clamp circuit.

Figure 2B:
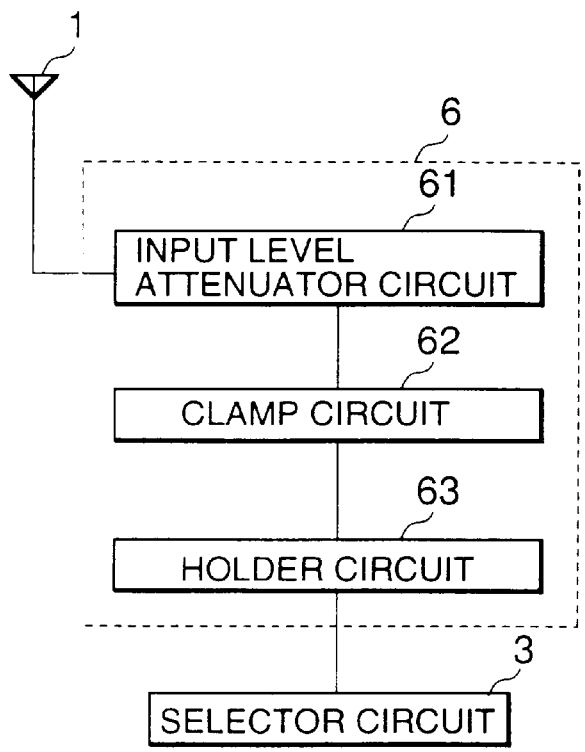
FIG. 2B shows a second illustrative example of the control signal generator circuit shown in FIG. 1A.

FIG. 2B shows another illustrative example of the structure of the control signal generator circuit 6. The circuit 6 is the same as the control generator circuit 6 shown in FIG. 2A, except that it comprises a holding circuit 63 for holding the control signal output from the clamp circuit 62.

Figure 5:
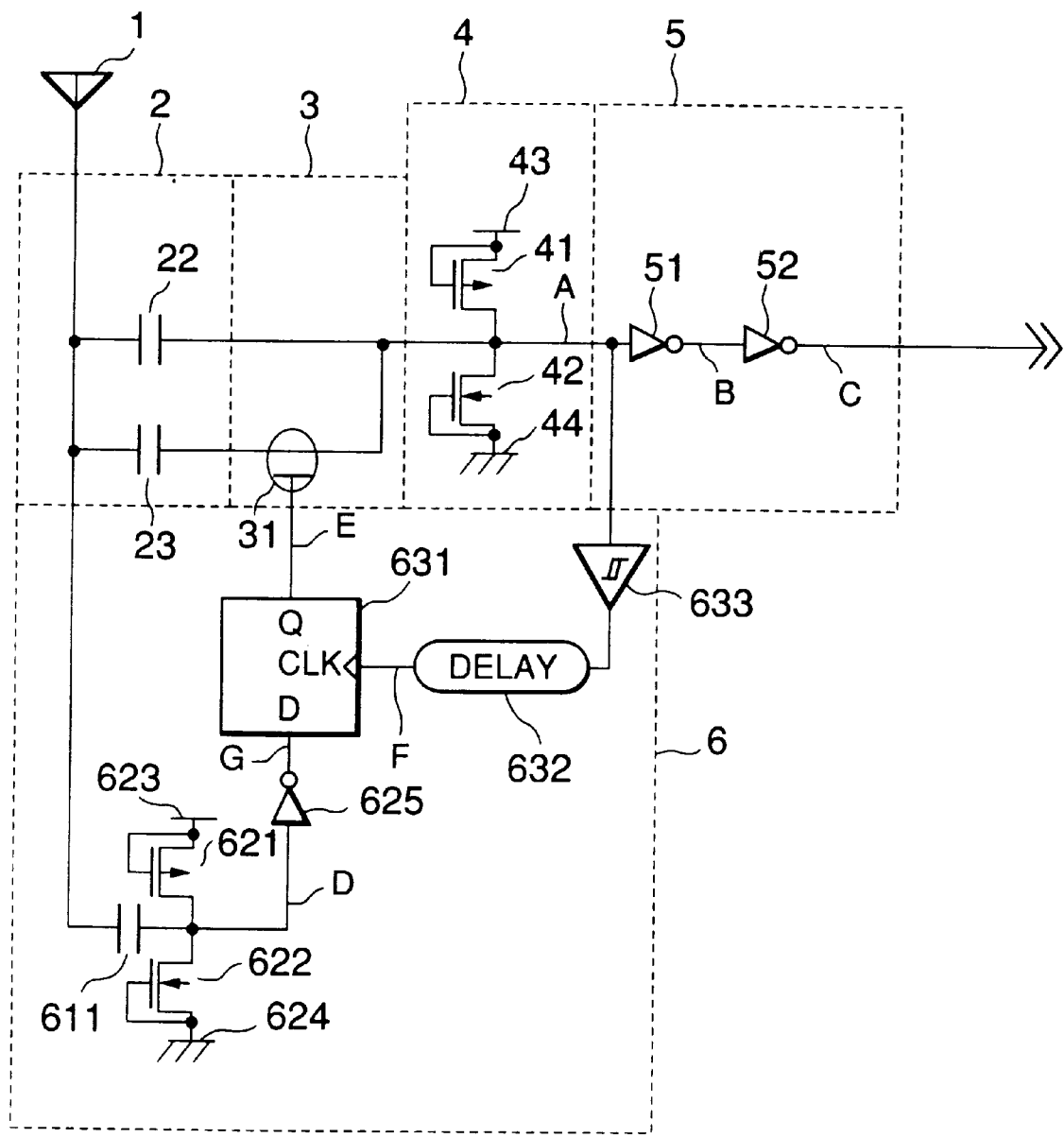
FIG. 5 shows an example of a detailed circuit diagram of the clock input circuit shown in FIG. 1A which incorporates the control signal generator circuit shown in FIG. 2B.

FIG. 5 shows an illustrative example of a clock input circuit in which the control signal generator 6 contains one control signal generator circuit $6_l$ (e.g. the control signal generator circuit $6_x$ shown in FIG. 2B). The example shown in FIG. 5 differs from the example shown in FIG. 3 because the holding circuit 63 is is provided between the clamp circuit 62 and the selector circuit 3. As shown in the figure, the holding circuit comprises a latch circuit 631, a delay 632, and a Schmitt trigger 633. The Schmitt trigger 633 inputs the signal output from the clamp circuit 4 and outputs a corresponding adjusted signal. The delay 632 inputs the adjusted signal and outputs a corresponding delayed signal. The latch circuit 631 inputs the signal from the inverter 625, latches such signal based on the delayed signal from the delay 632, and outputs a corresponding latched signal. The other portions of the clock input circuit are the same as or similar to the circuit described above in conjunction with FIG. 3.

Figure 6:
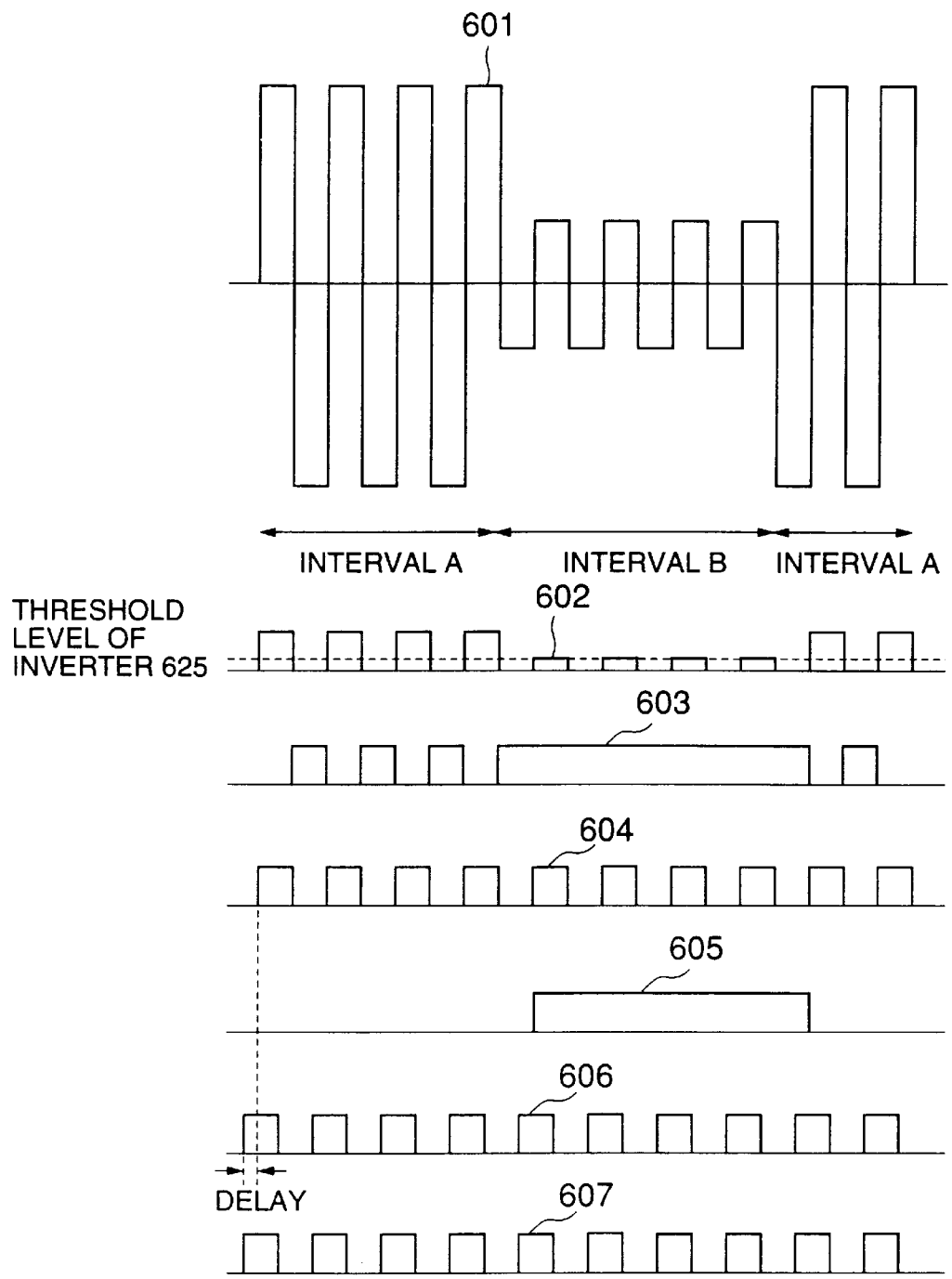
FIG. 6 shows various waveforms of signals generated or processed by the clock input circuit shown in FIG. 5.

FIG. 6 illustrates the waveforms of various signals located at various points A and C to G in the circuit shown in FIG. 5. As shown in FIG. 6, the input signal 601 has a first interval A and a second interval B and is received by the input antenna 1. The signal 602 represents the signal input to the inverter 625 (i.e. the signal at point D), and the signal 603 represents the signal output from the inverter 625 (i.e. the signal at point G). The signal 604 represents the delayed signal output from the delay circuit 632 (i.e. the signal at point F), and the signal 605 represents the latched signal output from the latch circuit 631 (i.e. the signal at point E). The signal 606 represents the signal output from the clamp circuit 4 (i.e. the signal at point A), and the signal 607 represents the base clock output from the inverter 52 (i.e. the signal at point C). Upon comparing FIGS. 3 and 4 with FIGS. 5 and 6, one can observe that the input signal 601 is identical to the input signal 401, that the signal 602 is identical to the signal 402, and that the signal 603 is identical to the signal 403.

The operation of the clock input circuit shown in FIG. 5 will be described below. The input signal 601 is input via the input antenna 1 and attenuated by the capacitor 611 to produce an attenuated signal. Also, the voltage of the attenuated signal is smaller than the voltage of the input signal 601 due to the capacitance $C_{611}$ of the capacitor 611. The attenuated signal is then clamped by the clamp circuit 62, if necessary, and is output by the inverter 625 as the inverted signal 602 (i.e. the signal at point G).

The input signal 601 is also attenuated by the capacitor 22 and/or the capacitor 23 to produce an attenuated signal, and the attenuated signal is clamped by the clamp circuit 4 to produce the clamped signal 606 (i.e. the signal at point A). The clamped signal 606 is processed by the Schmitt trigger 633 and delayed by a predetermined period of time via the delay circuit 632 to produce the delayed signal 604 (i.e. the signal at point F). The predetermined period of time should preferably be longer than the setup time of the latch circuit 631.

By appropriately setting the delay of the delay circuit 632, the clamped signal 606 (i.e. the signal at point A) can be delayed such that the delayed signal 604 (i.e. the signal at point F) instructs the latch circuit 631 to latch the inverted signal 603 (i.e. the signal at point G) when the inverted signal 603 equals a logic "0" during the interval A. As a result, the latched signal 605 (i.e. the signal at point E) equals a logic "0" during the interval A. Therefore, the input voltage 601 will only be attenuated by the capacitor 22 during the interval A, and the current flowing through the clamp circuit 4 will only equal $I_4=j\omega C_{22}(V_{601}-V_A)$ (where $V_{601}$ represents the voltage of the signal 601).

On the other hand, during the interval B, the voltage of the input signal 601 is attenuated by the capacitor 611 such that the voltage of the signal 602 (i.e. the signal at point D) never exceeds the threshold voltage of the inverter 625. As a result, the inverted signal 603 (i.e. the signal at point G) constantly equals a logic "1" during the interval B. Thus, the voltage of the latched signal 605 (i.e. the signal at point E) becomes a logic "1" during the entire interval B, and the transfer gate 31 is turned on. As a result, the input signal 601 is attenuated by the sum of the capacitance $C_{22}$ and $C_{23}$ of the capacitors 22 and 23. Therefore, the current flowing through the clamp circuit 4 during the interval B equals $I_4=j\omega(C_{22}+C_{23})(V_{601}-V_A)$.

In the clock input circuits shown in FIGS. 3 and 5, the input signal 401 or 601 is attenuated with a large capacitance $(C_{22}+C_{23})$ when the voltage of the input signal 401 or 601 is low and is attenuated with a small capacitance $(C_{22})$ when the voltage is high voltage. As a result, the clamp circuit can be operated at a low voltage and a minimum amount of current. Accordingly, the operation of clamp circuit is virtually avoided and the power consumption of the clock input circuit is dramatically reduced. Thus, sufficient energy can be more easily supplied to the clock input circuit when it is a larger distance from the card reader, and thus, the communication range of the IC card is increased.

In the embodiments above, the transfer gate 31 in the switching circuit 3 described above may comprise a P-type MOS transistor. The source (or drain) of the P-type MOS transistor may be connected to the capacitor 22 in the attenuator 2, and the drain (or source) may be connected to the clamp circuit 4. Also, the gate the P-type MOS transistor may input the control signal from the control signal generator 6.

Alternatively, the transfer gate 31 may comprise an N-type MOS transistor. The source (or drain) of the N-type MOS transistor may be connected to the capacitor 23, and the drain (or source) may be connected to the clamp circuit 4. Also, the gate of the N-type MOS transistor may input an inverted control signal from the control signal generator 6.

Also, the transfer gate 3 may comprise a P-type MOS transistor and an N-type MOS transistor. The respective sources and gates of the P and N type MOS transistors may be connected together. Also, the control signal may be input to the gate of the P-type MOS transistor, and an inverted control signal may be input to the gate of the N-type MOS transistor.

As shown in the embodiments above, the attenuator comprises two capacitors 22 and 23 (i.e. comprises (n)

attenuator circuits), and the control signal generator 6 generates one control signal (i.e. (n-1) control signals). Also, the selector circuit 3 always selects the first attenuated signal output from the first capacitor 22 and selectively outputs the second attenuated signal output from the second capacitor 23 based on the control signal.

However, in order to more precisely refine the composite attenuated signal output from the attenuator 2 to the clamp circuit 4, the attenuator 2 could contain additional capacitors (i.e. attenuating circuits) and the control signal generator 6 could contain additional control signal generating circuits for generating a plurality of control signals. For example, the attenuator 2 could contain three capacitors (i.e. (n) capacitors) which respectively output three attenuated signals. Also, the control signal generator 6 could contain two control signal generating circuits (i.e. (n-1) control signal generating circuits) which respectively output two control signals (i.e. (n-1) control signals). The selector 3 could always output the first attenuated signal from the first capacitor and could contain two transfer gates which selectively output the second and third attenuated signals based on the first and second control signals, respectively.

Also, the input signal is not limited to a two amplitude iS level signal corresponding to two data values but may be a three (or more) amplitude level signal corresponding to three (or more) data values. Thus, the selector may always output the first attenuated signal from the first capacitor during the first amplitude level of the signal, may output the first and second attenuated signals from the first and second capacitors during the second amplitude level of the signal, and may output the first, second, and third attenuated signals from the first, second, and third capacitors during the third amplitude level of the signal.

Figure 9:
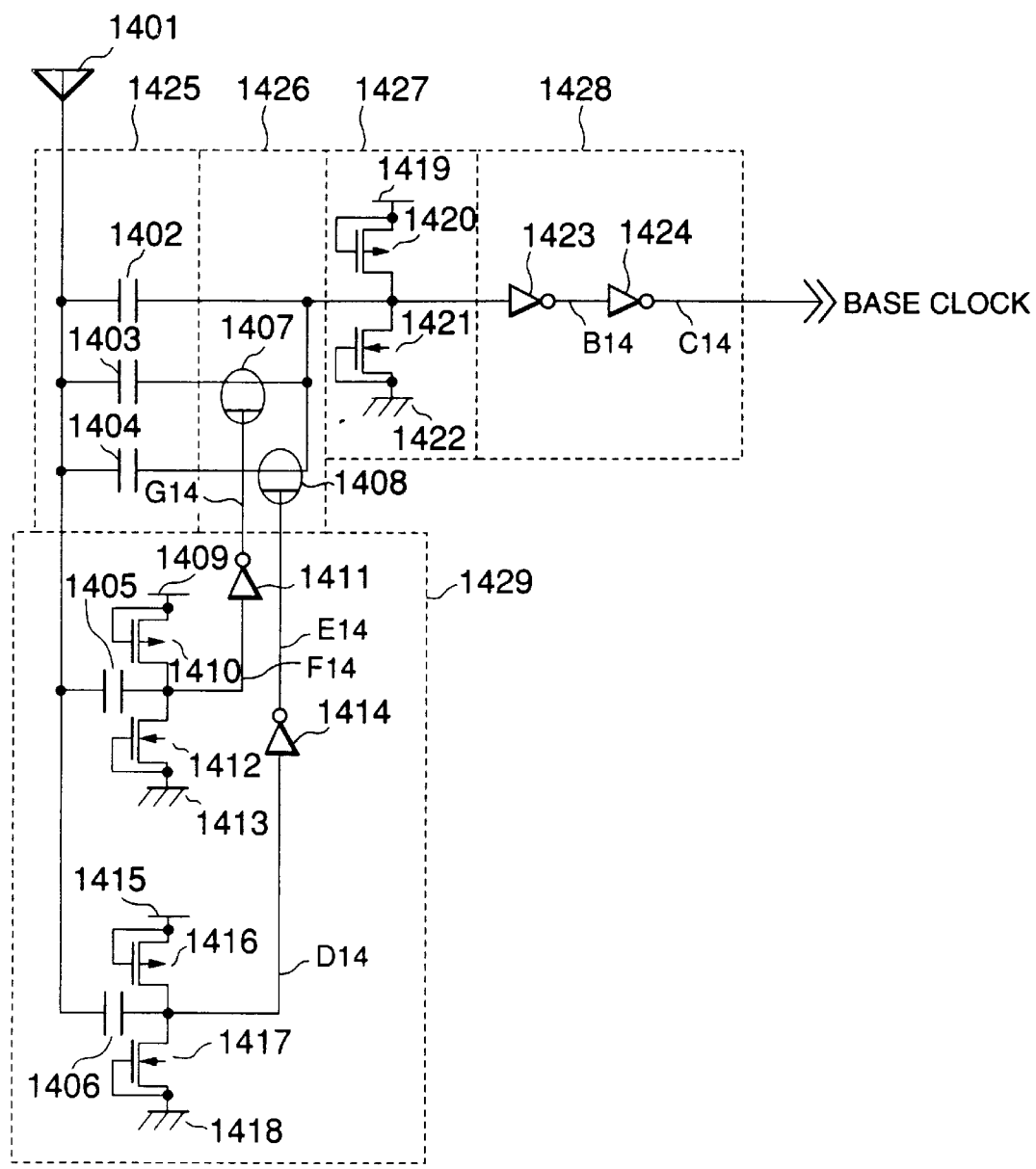
FIG. 9 shows an example of a detailed circuit diagram of the clock input circuit shown in FIG. 1A.

The above and other concepts are illustrated in the illustrative embodiment shown in FIG. 9, and the waveforms of various signals located at various points F14, G14, D14, E14, B14, and C14 in the circuit are shown in FIG. 10. As shown in FIG. 9, the attenuator 1425 comprises capacitors 1402, 1403, and 1404, and the selector circuit 1426 comprises transfer gates 1407 and 1408. The first clamp circuit 1427 comprises a P-type MOS transistor 1420 and an N-type MOS transistor 1421, and the buffer circuit 1428 comprises inverters 1423 and 1424.

Also, the control signal generator 1429 comprises a first control signal generating circuit (i.e. a second attenuator circuit and a second clamp circuit) and a second control signal generator circuit (i.e. a third attenuator circuit and a third clamp circuit). The second attenuator circuit comprises a capacitor 1405, and the third attenuator circuit comprises a capacitor 1406. The second clamp circuit comprises a P-type MOS transistor 1410, an N-type MOS transistor 1412, and an inverter 1411. The third clamp circuit comprises a P-type MOS transistor 1416, an N-type MOS transistor 1418, and an inverter 1414.

The point B14 represents the output of the inverter 1423, and the point C14 represents the output of the inverter 1424. The point D14 represents the input to the inverter 1414, and the point E14 represents the output of the inverter 1414. The point F14 represents the input to the inverter 1411, and the point G14 represents the output of the inverter 1411.

FIG. 10 illustrates the input signal 1501 which is received by the input antenna 1401. The signal 1501 has an interval H which has a high amplitude, an interval M which has a medium amplitude, and an interval L which has a low amplitude. During the intervals H, M, and L, the input signal 1501 respectively defines first, second, and third data values.

The signal 1502 represents the signal input to the inverter 1411 (i.e. the signal at point F14), and the signal 1503 represents the signal output from the inverter 1411 (i.e. the signal at point G14). The signal 1504 represents the signal input to the inverter 1414 (i.e. the signal at point D14), and the signal 1505 represents the signal output from the inverter 1414 (i.e. the signal at point E14). The signal 1506 represents the signal output from the inverter 1423 (i.e. the signal at point B14), and the signal 1507 represents the signal output from the inverter 1424 (i.e. the signal at point C14).

In the present embodiment, the capacitors 1402, 1403, 1404, 1405, and 1406 respectively have capacitances $C_{1402}$, $C_{1403}$, $C_{1404}$, $C_{1405}$, and $C_{1406}$, and the capacitances satisfy the following equations (6) and (7):

$$C_{1405} = C_{1402} \qquad (6)$$

$$C_{1406} = C_{1402} + C_{1403} \qquad (7)$$

Also, the relationship among the capacitances $C_{1402}$, $C_{1403}$, and $C_{1404}$ is dependent upon the ratio of various amplitudes of the input signal 1501 in a manner which is similar to the dependence of the relationship between the capacitances $C_{22}$ and $C_{23}$ described in the first embodiment. One of ordinary skill in the art will clearly know how to determine the values of the capacitances upon reading the present application.

Also, as shown in FIG. 10 the value of the capacitance $C_{1405}$ is such that the attenuated voltage signal output from the capacitor 1405 only has a voltage which is larger than the threshold voltage of the inverter 1411 during the interval H of the input signal 1501. (See the signal 1502 in FIG. 10). Therefore, the attenuating voltage signal output from the capacitor 1405 has a voltage which is smaller than the threshold voltage of the inverter 1411 during the intervals M and L of the input signal 1501. As a result, the inverter 1411 only outputs an inverted signal of the input signal 1501 during interval H of the input signal as shown by the signal 1503. During the intervals M and L, the inverter 1411 outputs a logic "1".

Also, the value of the capacitance $C_{1406}$ is such that the attenuated voltage signal output from the capacitor 1406 only has a voltage which is larger than the threshold voltage of the inverter 1414 during the intervals H and M of the input signal 1501. (See the signal 1504 in FIG. 10). Therefore, the attenuating voltage signal output from the capacitor 1406 has a voltage which is smaller than the threshold voltage of the inverter 1414 during the interval L of the input signal 1501. As a result, the inverter 1414 only outputs an inverted signal of the input signal 1501 during intervals H and M of the input signal as shown by the signal 1505. During the interval L, the inverter 1414 outputs a logic "1".

Based on the configuration above, both of the transfer gates 1407 and 1408 are turned off when the input signal 1501 is positive during the interval H. As a result, the input signal 1501 is attenuated based only on the capacitance $C_{1402}$ of the capacitor 1402. On the other hand, the transfer gate 1407 is turned on when the input signal 1501 is positive during the interval M. As a result, the input signal 1501 is attenuated based on the capacitances $C_{1402}$ and $C_{1403}$ of the capacitors 1402 and 1403 during the interval M. Finally, both of the transfer gates 1407 and 1408 are turned on when the input signal 1501 is positive during the interval L. As a result, the input signal 1501 is attenuated based on the capacitances $C_{1402}$, $C_{1403}$, and $C_{1404}$ of the capacitors 1402, 1403, and 1404 during the interval L. Therefore, for reasons which are similar to the reasons discussed above in the first and second embodiments, the third embodiment is capable of reducing the power of the clock input circuit.

The previous description of the preferred embodiments is provided to enable a person skilled in the art to make or use the present invention. Moreover, various modifications to these embodiments will be readily apparent to those skilled in the art, and the generic principles defined herein may be applied to other embodiments without the use of inventive faculty. Therefore, the present invention is not intended to be limited to the embodiments described herein but is to be accorded the widest scope as defined by the claims.

What is claimed:

1. A clock input circuit provided in a portable information medium, wherein said clock input circuit receives an input signal via an antenna of said portable information medium and generates a clock signal based on said input signal and wherein said clock input circuit, comprises:

an attenuator operably connected to said antenna, wherein said attenuator receives said input signal and outputs at least one attenuated signal;

a control signal generator operably connected to said antenna, wherein said control signal generator inputs said input signal and generates at least one control signal based on an amplitude of said input signal;

a selector circuit which is operably connected to said attenuator and to said control signal generator, wherein said selector circuit inputs said at least one attenuated signal and creates an output signal based on said at least one attenuated signal and said at least one control signal; and a clock signal processor which is operably coupled to said selector circuit, wherein said clock signal processor inputs said output signal and generates said clock signal based on said output signal.

2. The clock input circuit as claimed in claim 1, wherein:

said attenuator comprises (n) attenuator circuits which input said input signal and respectively output (n) attenuated signals, said control signal generator comprises (n-1) control signal generator circuits which input said input signal and respectively output (n-1) control signals, and said selector circuit inputs said (n) attenuated signals and selectively combines said (n) attenuated signals based on said (n-1) control signals to generate said output signal.

3. The clock input circuit as claimed in claim 2, wherein said selector circuit comprises:

(n-1) transfer circuits which respectively input first through (n-1)th attenuated signals of said (n) attenuated signals and which respectively input said (n-1) control signals, wherein said (n-1) transfer circuits selectively output said first through (n-1)th attenuated signals as (n-1) selected attenuated output signals based on said (n-1) control signals, respectively, and wherein said selector circuit combines said (n-1) selected attenuated output signals with an (n)th attenuated signal of said (n) attenuated signals to generate said output signal.

4. The clock input circuit as claimed in claim 1, wherein said clock signal processor comprises:

a clamp circuit which is operatively coupled to said selector circuit and which clamps said output signal to produce a clamped signal; and a buffer circuit which is operatively connected to said clamp circuit, which buffers said clamped signal, and which outputs said clock signal.

5. The clock input circuit as claimed in claim 2, wherein each of said (n-1) control signal generator circuits comprises:

a control signal generator circuit ("CSGC") attenuator circuit, wherein said CSGC attenuator circuit inputs said input signal and outputs a CSGC attenuated signal; and a CSGC clamping circuit which is operably coupled to said CSGC attenuator circuit, wherein said CSGC clamping circuit clamps said CSGC attenuated signal and outputs one of said (n-1) control signals.

6. The clock input circuit as claimed in claim 5, wherein said CSGC clamping circuit comprises:

a clamping portion which performs a clamping operation on said CSGC attenuated signal to produce a CSGC clamped signal; and an inverter which inverts said CSGC clamped signal to produce said one of said (n-1) control signal.

7. The clock input circuit as claimed in claim 2, wherein each of said (n-1) control signal generator circuits comprises:

a control signal generator circuit ("CSGC") attenuator circuit, wherein said CSGC attenuator circuit inputs said input signal and outputs a CSGC attenuated signal;

a CSGC clamping circuit which is operably coupled to said CSGC attenuator circuit, wherein said CSGC clamping circuit clamps said CSGC attenuated signal and outputs a CSGC clamped signal; and a holding circuit which is operably coupled to said selector circuit and said CSGC clamping circuit, wherein said holding circuit inputs said CSGC clamped signal and outputs said CSGC clamped signal as one of said (n-1) control signals.

8. The clock input circuit as claimed in claim 7, wherein said CSGC clamping circuit comprises:

a clamping portion which performs a clamping operation on said CSGC attenuated signal to produce a uninverted signal; and an inverter which inverts said uninverted signal to produce said CSGC clamped signal.

9. The clock input circuit as claimed in claim 7, wherein said holding circuit at least indirectly inputs said output signal from said selector circuit and outputs said CSGC clamped signal as said one of said (n-1) control signals based on said output signal.

10. The clock input circuit as claimed in claim 5, wherein said CSGC attenuator circuit is equivalent to one of said (n) attenuator circuits.

11. The clock input circuit as claimed in claim 7, wherein said CSGC attenuator circuit is equivalent to one of said (n) attenuator circuits.

12. The clock input circuit as claimed in claim 3, wherein each of said (n-1) control signal generator circuits comprises:

a control signal generator circuit ("CSGC") attenuator circuit which is a circuit equivalent of an (n)th attenuator circuit which outputs an (n)th attenuated signal of said (n) attenuated signals, wherein said CSGC attenuator circuit inputs said input signal and outputs a CSGC attenuated signal; and a CSGC clamping circuit which is operably coupled to said CSGC attenuator circuit, wherein said CSGC clamping circuit clamps said CSGC attenuated signal and outputs one of said (n-1) control signals.

13. The clock input circuit as claimed in claim 12, wherein said (n)th attenuator circuit comprises a first capacitor and said CSGC attenuator circuit comprises a second capacitor, and wherein a first capacitance of said first capacitor equals a second capacitance of said second capacitor.

14. The clock input circuit as claimed in claim 3, wherein a first transfer circuit of said (n-1) transfer circuits comprises:
   a P-type transistor which has a source that at least indirectly inputs a first attenuated signal of said (n) attenuated signals, which has a gate which inputs a first control signal of said (n-1) control signals, and which selectively outputs said first attenuated signal via a drain.

15. The clock input circuit as claimed in claim 3, wherein a first transfer circuit of said (n-1) transfer circuits comprises:
   an N-type transistor which has a source that at least indirectly inputs a first attenuated signal of said (n) attenuated signals, which has a gate which inputs a first control signal of said (n-1) control signals, and which selectively outputs said first attenuated signal via a drain.

16. The clock input circuit as claimed in claim 3, wherein a first transfer circuit of said (n-1) transfer circuits comprises:
   an P-type transistor which has a P-type source that inputs a first attenuated signal of said (n) attenuated signals, which has a P-type gate which inputs a first control signal of said (n-1) control signals, and which selectively outputs said first attenuated signal via a P-type drain; and
   a N-type transistor which has an N-type source that is coupled to said P-type source, which has an N-type drain that is coupled to said P-type drain, and which has an N-type gate which inputs an inverted signal of said first control signal.

17. The clock input circuit as claimed in claim 4, wherein said buffer circuit consists of:
   an even number of inverters coupled in a series with each other, wherein a first one of said inverters inputs said clamped signal.

18. A clock input circuit provided in a portable information medium, wherein said clock input circuit receives an input signal via an antenna of said portable information medium and generates a clock signal based on said input signal and wherein said clock input circuit, comprises:
   an attenuator which is operably connected to said antenna and comprises a first attenuating circuit and a second attenuating circuit, wherein said first attenuating circuit receives said input signal and outputs a first attenuated signal and wherein said second attenuating circuit receives said input signal and outputs a second attenuated signal;
   a control signal generator circuit operably connected to said antenna, wherein said control signal generator circuit inputs said input signal and generates a control signal based on an amplitude of said input signal;
   a selector circuit which is operably connected to said attenuator and to said control signal generator, wherein said selector circuit inputs said first attenuated signal and said second attenuated signal and creates an output signal based on said control signal; and
   a clock signal processor which is operably coupled to said selector circuit, wherein said clock signal processor inputs said output signal and generates said clock signal based on said output signal.

19. The clock input circuit as claimed in claim 18, wherein said selector circuit comprises:
   a transfer circuit which inputs said second attenuated signal and said control signal and selectively outputs said second attenuated signal as a selected attenuated output signal based on said control signal, and
   wherein said selector circuit selectively combines said first attenuated output signal with said selected attenuated output signal to generate said output signal.

20. The clock input circuit as claimed in claim 19, wherein said control signal generator circuit comprises:
   a control signal generator circuit ("CSGC") attenuator circuit which inputs said input signal and outputs a CSGC attenuated signal; and
   a CSGC clamping circuit which is operably coupled to said CSGC attenuator circuit, wherein said CSGC clamping circuit clamps said CSGC attenuated signal and outputs said control signal.

21. The clock input circuit as claimed in claim 18, wherein said control signal generator circuit comprises:
   a control signal generator circuit ("CSGC") attenuator circuit which inputs said input signal and outputs a CSGC attenuated signal;
   a CSGC clamping circuit which is operably coupled to said CSGC attenuator circuit, wherein said CSGC clamping circuit clamps said CSGC attenuated signal and outputs a CSGC clamped signal; and
   a holding circuit which is operably coupled to said selector circuit and said CSGC clamping circuit, wherein said holding circuit inputs said CSGC clamped signal and outputs said CSGC clamped signal as said control signal.

22. The clock input circuit as claimed in claim 21, wherein said holding circuit at least indirectly inputs said output signal from said selector circuit and outputs said CSGC clamped signal as said control signal based on said output signal.

23. The clock input circuit as claimed in claim 20, wherein said CSGC attenuator circuit is equivalent to said first attenuator circuit.

24. The clock input circuit as claimed in claim 21, wherein said CSGC attenuator circuit is equivalent to said first attenuator circuit.

25. The clock input circuit as claimed in claim 23, wherein said first attenuator circuit comprises a first capacitor and said CSGC attenuator circuit comprises a second capacitor, and
   wherein a first capacitance of said first capacitor equals a second capacitance of said second capacitor.

26. The clock input circuit as claimed in claim 24, wherein said first attenuator circuit comprises a first capacitor and said CSGC attenuator circuit comprises a second capacitor, and
   wherein a first capacitance of said first capacitor equals a second capacitance of said second capacitor.

27. The clock input circuit as claimed in claim 25, wherein said input signal has a first amplitude when said input signal represents a first logic value and has a second amplitude when said input signal represents a second logic value,
   wherein said selector circuit comprises a transfer circuit which inputs said second attenuated signal and said control signal and selectively outputs said second attenuated signal as a selected attenuated output signal based on said control signal,
   wherein said selector circuit combines said first attenuated output signal with said selected attenuated output signal to produce said output signal, and wherein said control signal instructs said transfer circuit to output said second attenuated signal as said selected attenuated signal when said input signal has a voltage equivalent to said first amplitude.

28. The clock input circuit as claimed in claim 26, wherein said input signal has a first amplitude when said input signal represents a first logic value and has a second amplitude when said input signal represents a second logic value,
  wherein said selector circuit comprises a transfer circuit which inputs said second attenuated signal and said control signal and selectively outputs said second attenuated signal as a selected attenuated output signal based on said control signal,
  wherein said selector circuit combines said first attenuated output signal with said selected attenuated output signal to produce said output signal, and
  wherein said control signal instructs said transfer circuit to output said second attenuated signal as said selected attenuated signal when said input signal has said first amplitude.

29. The clock input circuit as claimed in claim 27, wherein said control signal instructs said transfer circuit not to output said second attenuated signal as said selected attenuated signal when said input signal has said second amplitude.

30. The clock input circuit as claimed in claim 28, wherein said control signal instructs said transfer circuit not to output said second attenuated signal as said selected attenuated signal when said input signal has said second amplitude.

31. The clock input circuit as claimed in claim 22, wherein said holding circuit comprises:
  a delay circuit which at least indirectly inputs said output signal and outputs a corresponding delay signal; and
  a latch circuit which inputs said CSGC clamped signal and latches said CSGC clamped signal as said control signal in accordance with said delay signal.

32. The clock input circuit as claimed in claim 31, wherein said clock signal processor comprises:
  a clamp circuit which is operatively coupled to said selector circuit and which clamps said output signal to produce a clamped signal; and
  a buffer circuit which is operatively connected to said clamp circuit, which buffers said clamped signal, and which outputs said clock signal,
  wherein said delay circuit at least indirectly inputs said clamped signal and delays said clamped signal to produce said delay signal.

33. The clock input circuit as claimed in claim 31, wherein said input signal has a first amplitude when said input signal represents a first logic value and has a second amplitude when said input signal represents a second logic value, and
  wherein said latch circuit latches said control signal such that said control signal instructs said transfer circuit to output said second attenuated signal as said selected attenuated signal during a period when said input signal has said first amplitude.

34. The clock input circuit as claimed in claim 33, wherein said latch circuit latches said control signal such that said control signal instructs said transfer circuit not to output said second attenuated signal as said selected attenuated signal during a period when said input signal has said second amplitude.

35. The clock input circuit as claimed in claim 20, wherein said attenuator comprises:

a third attenuating circuit which receives said input signal and outputs a third attenuated signal.

36. The clock input circuit as claimed in claim 35, wherein said selector circuit comprises a second transfer circuit which inputs said third attenuated signal and a second control signal and selectively outputs said third attenuated signal as a third attenuated output signal based on said second control signal,
  wherein said selector circuit selectively combines said first attenuated output signal, said selected attenuated output signal, and said second selected attenuated output signal to generate said output signal.

37. The clock input circuit as claimed in claim 35, wherein said control signal generator circuit comprises;
  a second CSGC attenuator circuit which inputs said input signal and outputs a second CSGC attenuated signal; and
  a second CSGC clamping circuit which is operably coupled to said second CSGC attenuator circuit,
  wherein said second CSGC clamping circuit clamps said second CSGC attenuated signal and outputs said second control signal.

38. The clock input circuit as claimed in claim 37, wherein said first attenuating circuit comprises a first capacitor and said CSGC attenuator circuit comprises a second capacitor, and
  wherein a first capacitance of said first compacitor equals a second capacitance of said second capacitor.

39. The clock input circuit as claimed in claim 38, wherein said input signal has a first amplitude when said input signal represents a first value, has a second amplitude when said input signal represents a second value, and has a third amplitude when said input signal represents a third value,
  wherein said CSGC clamping circuit and said second CSGC clamping circuit respectively output said control signal and said second control signal to instruct said transfer circuit and said second transfer gate not to output said second attenuated signal and said third attenuated signal when said input signal represents said first value,
  wherein said CSGC clamping circuit outputs said control signal to instruct said transfer circuit to output said second attenuated signal as said selected attenuated output signal and said second CSGC clamping circuit outputs said second control signal to instruct said second transfer circuit not to output said third attenuated signal when said input signal represents said second value, and
  wherein said CSGC clamping circuit and said second CSGC clamping circuit respectively output said control signal and said second control signal to instruct said transfer circuit and said second transfer circuit to output said second attenuated signal and said third attenuated signal as said selected attenuated output signal and said second selected attenuated output signal when said input signal represents said third value.

40. A clock input circuit, comprising:
an antenna that receives an input signal;
a first capacitor coupled between said antenna and a node;
a second capacitor coupled to said antenna;
a transfer gate coupled between said second capacitor and said node;
a clamp circuit coupled to said node;
a buffer circuit coupled to said clamp circuit; and a control signal generator that is coupled between said antenna and said transfer gate and that inputs said input signal, wherein said control signal gencrator produce a control signal to selectively turn said transfer gate ON and OFF, wherein, when an amplitude of said input signal is larger than a predetermined value, said control signal generator outputs said control signal to turn said transfer gate turns ON, and wherein, when said amplitude of said input signal is smaller than said predetermined value, said control signal generator outputs said control signal to turn said transfer gate turns OFF.

* * * * *

UNITED STATES PATENT AND TRADEMARK OFFICE
CERTIFICATE OF CORRECTION

PATENT NO.: 6,118,320
DATED: September 12, 2000
INVENTOR(S): Kenzi, SINGYOUTI

It is certified that error(s) appears in the above-identified patent and that said Letters Patent is hereby corrected as shown below:

Column 7, line 15 & 16, delete all three occurrences of "6", insert --$6_x$--

Column 7, line 29, delete "20"

Column 8, line 50, after "gate", insert --of--

Column 9, line 22, after "amplitude", delete "iS"

Signed and Sealed this

Twenty-ninth Day of May, 2001

Attest:

NICHOLAS P. GODICI

*Attesting Officer*   *Acting Director of the United States Patent and Trademark Office*